Figure 1:
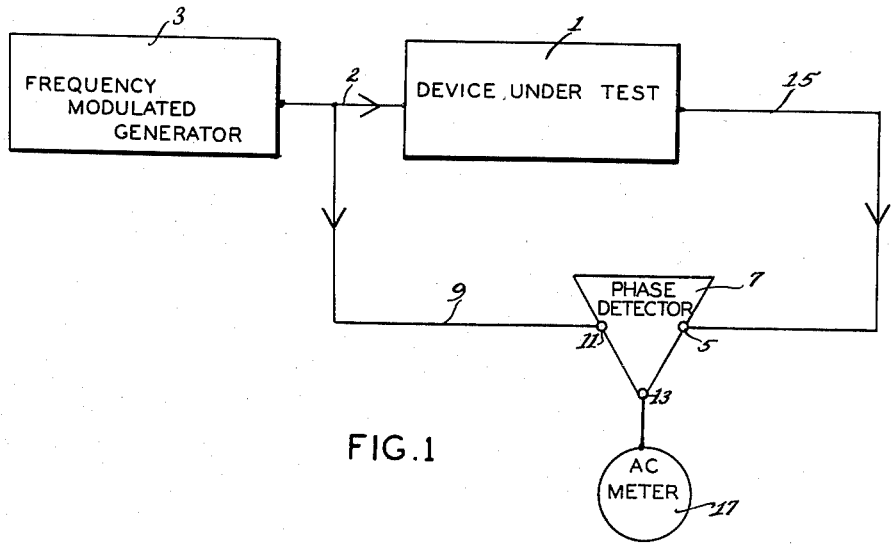

Jan. 31, 1961   D. B. SINCLAIR   2,970,258
APPARATUS FOR MEASURING ENVELOPE DELAY
Filed Aug. 29, 1955   2 Sheets-Sheet 1

INVENTOR.
DONALD B. SINCLAIR
BY Rines and Rines
ATTORNEYS

Jan. 31, 1961  D. B. SINCLAIR  2,970,258
APPARATUS FOR MEASURING ENVELOPE DELAY
Filed Aug. 29, 1955  2 Sheets-Sheet 2

INVENTOR.
DONALD B. SINCLAIR
BY *Rines and Rines*
ATTORNEYS

United States Patent Office

2,970,258
Patented Jan. 31, 1961

2,970,258
APPARATUS FOR MEASURING ENVELOPE DELAY

Donald B. Sinclair, Concord, Mass., assignor to General Radio Company, Cambridge, Mass., a corporation of Massachusetts Filed Aug. 29, 1955, Ser. No. 531,126

12 Claims. (Cl. 324—57)

The present invention relates to electric methods and apparatus and, more particularly, to methods of and apparatus for measuring the envelope delay produced by an electrical system when an alternating-current wave of a predetermined frequency is passed through the system.

It is very important in many applications of alternating-current waves to know before-hand the nature of the phase shifts that will be produced if waves of different frequencies are caused to be transmitted through particular electrical systems. This is of importance, for example, in television transmitting systems, where the phase characteristics of a particular electrical circuit or group of circuits over the band of frequencies that are to be passed therethrough must be predetermined in advance. In general, it may be stated that the phase shift, introduced by an electrical system into waves of frequency within a particular frequency band passed therethrough, increases in accordance with increasing frequency. In the case of television transmitters, before referred to, the region of interest in the phase shift versus frequency characteristic of the electrical system is confined to the band of frequencies over which operation is to be effected. The slope of the curve representing this phase shift versus frequency characteristic at any particular frequency is a measure of the time delay that the electrical system introduces into the wave energy of that frequency transmitted therethrough, and it is this quantity that is defined as "envelope delay."

The art has long struggled with the problem of finding a simple and reliable technique and apparatus for measuring envelope delay. Many proposals have been advanced for accomplishing this result. Phase measurements have heretofore been made, at different frequencies and the delay has been computed from the measured difference in phase at two different frequencies. As a further illustration, it has been proposed to measure the envelope delay by amplitude-modulating a signal and measuring the phase difference between the side bands that results from passage through the system under test. In all cases, however, special complicated equipment is necessary and the techniques involved are neither simply carried out nor are they particularly adapted for use with conventional apparatus.

An object of the present invention, on the other hand, is to provide a new and improved method of and apparatus for the measurement of envelope delay that shall not be subject to the above-mentioned disadvantages and, to the contrary, shall involve extremely simple operational steps and the utilization of easily accessible, standard equipment.

Other and further objects will be explained hereinafter and will be more particularly pointed out in the appended claims.

Figure 2:
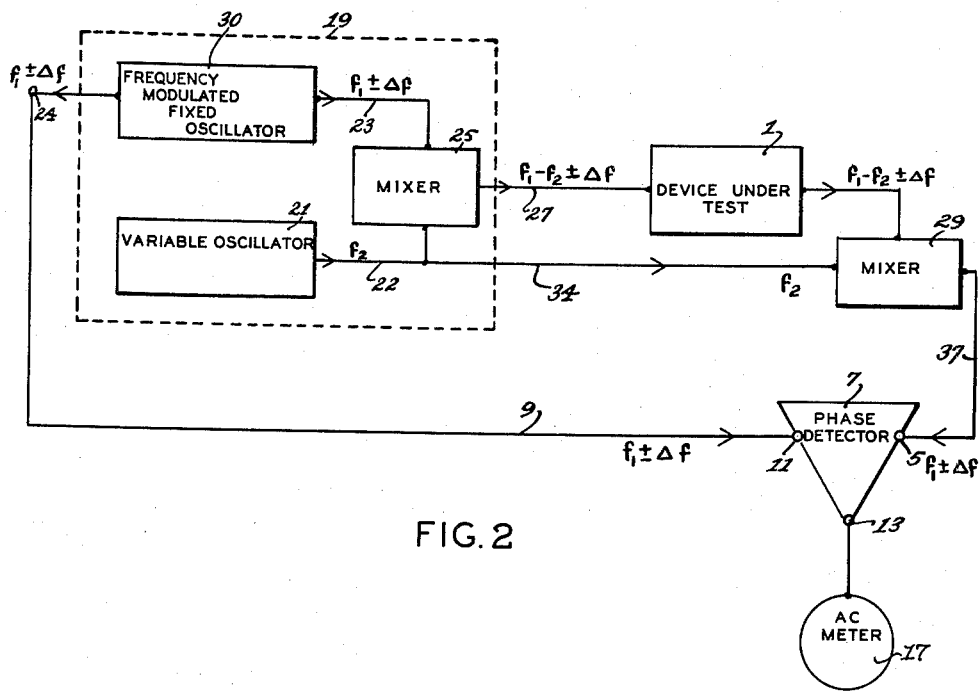
Figure 3:
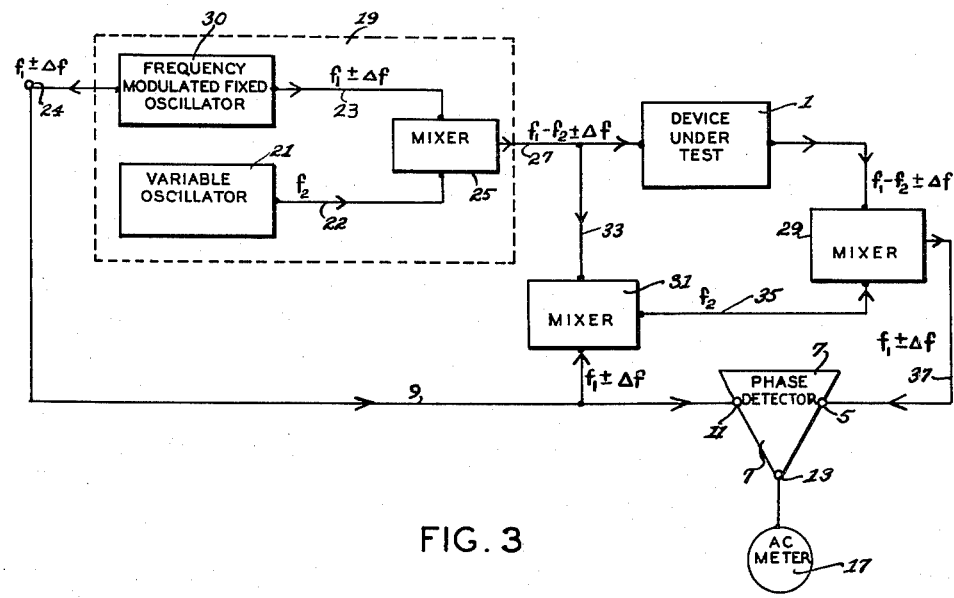

The invention will now be described in connection with the accompanying drawings, Fig. 1 of which is a block diagram illustrating the invention in simplified form; and Figs. 2 and 3 are similar diagrams of modifications.

Referring to Fig. 1, a device to be tested is shown at 1, connected by conductors 2 and 15 between a source of frequency-modulated alternating-current wave energy 3, and one of the input terminals 5 of a phase detector 7. The device 1 may be any desired electrical system the enevelope delay of which, over a certain operating frequency range, is to be determined. The frequency-modulated generator 3 is also connected by a conductor 9 to the other input terminal 11 of the phase detector 7. While the terminals 5 and 11 and the conductors 2, 9 and 15 and the similar terminals and conductors of hereinafter described Figs. 2 and 3 are shown as single terminals and conductors, respectively, this is only for purposes of illustration, it beng understood that, in actual practice, pairs of terminals and conductors will be utilized, as is well known. The frequency-modulated generator 3 may assume any desired form, such as, for example, an oscillator the frequency of which may be rapidly repetitively varied above and below a predetermined center or carrier frequency to any desired degree. An example of such a generator is, for example, a reactance-tube-modulated vacuum- or electron-tube oscillator. The conductor 9 represents a path of known predetermined phase-shift characteristic over the frequency variation of the frequency-modulated generator 3 and it may comprise, for example, just ordinary conductors offering substantially zero phase shift or known envelope delay.

Except for the feature of the rapidly repetitively varying frequency of the generator 3, the system thus far described has previously been utilized for the purpose of obtaining at the output terminal 13 of the phase detector 7 a direct-current signal proportional to the phase difference between the energy passed along the two paths 2—1—15 and 9 to the phase detector 7. The phase detector 7 may be of any conventional type and the phase difference may be measured by direct-current meters and the like connected to the output terminal 13.

In accordance with the present invention, on the other hand, the frequency of the generator 3 is, as before stated, rapidly periodically varied back and forth, and an alternating-current meter or indicator 17 is connected to the output terminal 13 of the phase detector 7 to provide an entirely novel and very beneficial result. Specifically, if the frequency of the generator 3 is rapidly varied at a predetermined rate from a center or carrier frequency over narrow frequency limits, an alternating-current component will appear in the output 13 of the phase detector 7 resulting from the corresponding rapidly varying phase difference between the interacting signals fed along the paths 2—1—15 and 9 to the respective phase-detector input terminals 5 and 11. This alternating-current component will be of frequency corresponding to the rapid rate of variation of the frequency of the generator 3 about its center or carrier frequency and it will have a peak-to-peak magnitude that is proportional to the difference between the phase shifts produced at the two limits of frequency variation of the generator 3. As before stated, the envelope delay is the slope of the phase versus frequency characteristic of the device 1, or, expressed mathematically, the derivative or rate of change of the phase with respect to the frequency. The alternating-current component at the output terminal 13 of the phase detector 7, provided the change in frequency or the limits of the frequency modulation of the generator 3 is small and constant, irrespective of the value of the center or carrier frequency, will thus be a measure of the rate of change of phase with respect to frequency over the narrow frequency variation limits, and thus a measure of the slope of the phase versus frequency characteristic; i.e., a measure of the envelope delay. By calibrating the scale of the alternating-current meter or other alternating-current indicator 17 in units of time, therefore, the envelope delay introduced by the device 1 may be read off directly.

A preferred combination of readily available and well-known apparatus for performing the measurement of envelope delay in accordance with the present invention is illustrated in Fig. 2. A generator 19 of the beat-frequency variety is shown, comprising a frequency-modulated fixed oscillator 30 and a variable beating or heterodyning oscillator 21. If the predetermined center frequency of the oscillator 30 is represented by the symbol $f_1$, the output of the frequency-modulated oscillator 30 varies over the frequency range $f_1 \pm \Delta f$, where $\Delta f$ is the maximum amount of frequency variation, modulation or deviation. This output $f_1 \pm \Delta f$ is fed along a first path by conductor 23 to the input of a first frequency converter or mixer 25. There is also fed into the input of the mixer 25 by conductor 22, the output signal of frequency $f_2$ of the variable or beating oscillator 21. There then results in the output conductor 27 of the mixer 25 a first converted center frequency $f_1-f_2$, which is a second carrier wave of preferably lower frequency than that of the center frequency $f_1$ of the oscillator 30, and bears the frequency modulation $\pm \Delta f$. The complete converted frequency $f_1-f_2 \pm \Delta f$ is fed by the output conductor 27 from the mixer 25 through the device 1 under test to the input of a further frequency converter or mixer 29. The output $f_2$ of the variable oscillator 21 is also fed by conductor 34 to the input of the further frequency converter or mixer 29, producing in the output 37 of the mixer 29 a third carrier wave of frequency corresponding to the original frequency $f_1 \pm \Delta f$ of the oscillator 30 but which has suffered the envelope delay in passing through the device 1 under test. The signal fed along the envelope-delay path through the device 1 is thus applied by the conductor 37 to the right-hand input terminal 5 of the phase detector 7. To the left-hand input terminal 11 of the phase detector 7 is fed the output $f_1 \pm \Delta f$ of the oscillator 30, along the second path 24—9 of known predetermined envelope delay characteristic. The alternating-current component of the output 13 of the phase detector 7 will be measured on the alternating-current indicator 17, properly calibrated in units of time, and will thereby, as before stated, give a direct reading or indication of the envelope delay produced by the electrical system or device under test at the first converted center frequency $f_1-f_2$, relative to the predetermined envelope delay of the second path 24—9.

In some cases, it may not be convenient to obtain from conventional beat-frequency generators 19 the output of the variable oscillator 21 that is fed by conductor 34 to the input of the mixer 29. A third frequency converter or mixer 31 may then be utilized, as illustrated in Fig. 3. The signal $f_1-f_2 \pm \Delta f$ resulting from the mixer 25 may be fed by conductors 27 and 33 to the input of the mixer 31, as may the signal $f_1 \pm \Delta f$ passing along the conductor 9. There is then available in the output of the mixer 31 the frequency $f_2$ for application to the input of the mixer 29 by way of conductor 35.

It will be observed that in the heterodyning systems of Figs. 2 and 3, a phase comparison is still always made at a single carrier frequency. In order to maintain substantially equal the amplitude of the signals fed to the phase detector inputs 5 and 11, clippers or similar amplitude-control limiters of negligible phase shift may be used in the connections to the phase-detector input terminals. This operation will be independent, moreover, of the first converted center frequency $f_1-f_2$ which is applied to the device 1 under test. The operation of the apparatus, therefore, may be effected over extremely wide frequency ranges.

The systems above-described may operate with sinusoidal alternating-current energy over any reasonable frequency ranges, say, for example, from 100 kilocycles to 10 megacycles, more or less. The rapid frequency variation of the oscillator 30 may occur at a low audio rate, say 60 cycles, more or less. Assuming a deviation $\Delta f$ of $\pm 20$ kilocycles and a predetermined frequency $f_1-f_2$ of 10 megacycles, as a further illustration, substantially 7.2 degrees maximum phase shift will be produced for each microsecond of envelope delay. If the alternating-current meter or indicator 17 is adapted to respond to 60 cycles and has, for example, a two-volt scale, the system may be designed so that the voltage calibrations of the scale of the meter or indicator 17 may be directly read in microseconds of delay, two-volts corresponding to two microseconds of delay.

The accuracy of these systems, however, may be affected not only by amplitude variation, before discussed, but by wave-shape variation as when the device under test introduces amplitude distortion, so that the two signals applied to the inputs 5 and 11 of the phase detector 7 do not have the same wave-form. A preferred technique for obviating such difficulties embodies amplification and clipping or the like to convert the sinusoidal waves to pulses of substantially square or rectangular waves of constant amplitude, having transitions from positive to negative at the times of zero crossing that occur in substantially zero time. Such square or rectangular pulses makes amplitude adjustment unnecessary to obtain proper operation of a counter-type phase detector, and the center or carrier frequency $f_1$ can be manually tuned or automatically swept at a suitable rate for recording without adjustment.

Further modifications will occur to those skilled in the art and all such are to be considered to fall within the spirit and scope of the invention, as defined in the appended claims.

What is claimed is:

1. Apparatus for measuring the envelope delay introduced by an electrical system into an alternating-current wave of predetermined frequency that comprises means for varying the frequency of the wave at a predetermined rate between narrow frequency limits, means for transmitting the varying-frequency alternating-current wave along a first path containing the electrical system, means for simultaneously transmitting the varying-frequency alternating-current wave along a second path that produces a predetermined envelope delay, means for interacting the waves transmitted along the two paths to produce a voltage the magnitude of which is instantaneously proportional to the phase shift between the waves transmitted along the first and second paths and that may be resolved into a direct-current component and an alternating-current component of frequency corersponding to the said predetermined rate of variation, and means for indicating the said alternating-current component of the said voltage, thereby to indicate the envelope delay of the electrical system relative to the said predetermined envelope delay.

2. Apparatus for measuring the envelope delay introduced by an electrical system into an alternating-current wave of predetermined frequency that comprises means for varying the frequency of the wave at a predetermined rate between narrow frequency limits, means for transmitting the varying-frequency alternating-current wave along a first path containing the electrical system, means for simultaneously transmitting the varying-frequency alternating-current wave along a second path that produces a predetermined envelope delay, means for interacting the waves transmitted along the two paths to produce a voltage the magnitude of which is instantaneously proportional to the phase shift between the waves transmitted along the first and second paths and that may be resolved into a direct-current component and an alternating-current component of frequency corresponding to the said predetermined rate of variation, means for indicating the said alternating-current component of the said voltage, and means for calibrating the said indication in units of time, thereby to indicate the envelope delay of the electrical system relative to the said predetermined envelope delay.

3. Apparatus for measuring the envelope delay introduced by an electrical system into an alternating-current wave of predetermined center frequency that comprises means for varying the frequency of the wave at a predetermined rate between narrow frequency limits, means for transmitting the varying-frequency alternating-current wave along a first path containing the electrical system, means for simultaneously transmitting the varying-frequency alternating-current wave along a second path that produces a predetermined envelope delay, means for interacting the waves transmitted along the two paths to produce a voltage having a direct-current component substantially proportional to the relative phase shift between the waves transmitted along the first and second paths at the said predetermined center frequency and an alternating-current component having a frequency corresponding to the said predetermined rate of variation and the peak-to-peak magnitude of which is substantially proportional to the difference between the relative phase shifts between the waves transmitted along the first and second paths at the said limits of the said frequency variation, and means for indicating the alternating-current component of the said voltage, thereby to indicate the envelope delay of the electrical system relative to the said predetermined envelope delay.

4. Apparatus for measuring the envelope delay introduced by an electrical system into an alternating-current wave of predetermined center frequency that comprises means for varying the frequency of the wave at a predetermined rate between narrow frequency limits, means for transmitting the varying-frequency alternating-current wave along a first path containing the electrical system, means for simultaneously transmitting the varying-frequency alternating-current wave along a second path that produces a predetermined envelope delay, means for interacting the waves transmitted along the two paths to produce a voltage having a direct-current component substantially proportional to the relative phase shift between the waves transmitted along the first and second paths at the said predetermined center frequency and an alternating-current component having a frequency corresponding to the said predetermined rate of variation and the peak-to-peak magnitude of which is substantially proportional to the difference between the relative phase shifts between the waves transmitted along the first and second paths at the said limits of the said frequency variation, and means for indicating the said peak-to-peak magnitude of the alternating-current component of the said voltage, thereby to indicate the envelope delay of the electrical system relative to the said predetermined envelope delay.

5. Apparatus for measuring the envelope delay introduced by an electrical system into an alternating-current wave of predetermined center frequency that comprises means for varying the frequency of the wave at a predetermined rate between narrow frequency limits, means for transmitting the varying-frequency alternating-current wave along a first path containing the electrical system, means for simultaneously transmitting the varying-frequency alternating-current wave along a second path that produces a predetermined envelope delay, means for interacting the waves transmitted along the two paths to produce a voltage having a direct-current component substantially proportional to the relative phase shift between the waves transmitted along the first and second paths at the said predetermined center frequency and an alternating-current component having a frequency corresponding to the said predetermined rate of variation and the peak-to-peak magnitude of which is substantially proportional to the difference between the relative phase shifts between the wave transmitted along the first and second paths at the said limits of the said frequency variation, means for indicating the said alternating-current component of the said voltage, and means for calibrating the said indication in units of time, thereby to indicate the envelope delay of the electrical system relative to the said predetermined envelope delay.

6. Apparatus for measuring the envelope delay introduced by an electrical system into an alternating-current wave of predetermined center frequency that comprises means for varying the frequency of the wave at a predetermined rate between narrow frequency limits, means for transmitting the varying-frequency alternating-current wave along a first path containing the electrical system, means for simultaneously transmitting the varying-frequency alternating-current wave along a second path that produces substantially zero phase shift, means for interacting the waves transmitted along the two paths to produce a voltage having a direct-current component substantially proportional to the phase shift introduced by the electrical system at the said predetermined frequency and an alternating-current component having a frequency corresponding to the said predetermined rate of variation and the peak-to-peak magnitude of which is substantially proportional to the difference between the phase shifts introduced by the electrical system at the said limits of the said frequency variation, and means for indicating the said alternating-current component of the said voltage, thereby to indicate the envelope delay of the electrical system.

7. Apparatus for measuring the envelope delay introduced by an electrical system into an alternating-current wave of predetermined center frequency that comprises means for varying the frequency of the wave at a predetermined rate between narrow frequency limits to produce a frequency-modulated carrier wave, means for converting the frequency-modulated carrier wave to a similarly frequency-modulated second carrier wave of lower carrier frequency, means for transmitting the frequency-modulated second carrier wave along a first path containing the electrical system, means for simultaneously transmitting the frequency-modulated first carrier wave along a second path that produces a predetermined envelope delay, means for re-converting the frequency-modulated second carrier wave transmitted along the first path and through the electrical system to a similarly frequency-modulated third carrier wave of carrier frequency corresponding to the said predetermined center frequency of the first carrier wave, means for interacting the third carrier wave with the first carrier wave transmitted along the second path to produce a voltage having a direct-current component substantially proportional to the relative phase shift between the waves transmitted along the first and second paths at the said predetermined center frequency and an alternating-current component having a frequency corresponding to the said predetermined rate of variation and the peak-to-peak magnitude of which is substantially proportional to the difference between the relative phase shifts between the waves transmitted along the first and second paths at the said limits of the said frequency variation, and means for indicating the said alternating-current component of the said voltage, thereby to indicate the envelope delay of the electrical system relative to the said predetermined envelope delay.

8. Apparatus for measuring the envelope delay introduced by an electrical system into an alternating-current wave of predetermined center frequency that comprises means for varying the frequency of the wave at a predetermined rate between narrow frequency limits to produce a frequency-modulated carrier wave, means for converting the frequency-modulated carrier wave to a similarly frequency-modulated second carrier wave of lower carrier frequency, means for transmitting the frequency-modulated second carrier wave along a first path containing the electrical system, means for simultaneously transmitting the frequency-modulated first carrier wave along a second path that produces a predetermined envelope delay, means for re-converting the frequency-modulated second carrier wave transmitted along the first path and through the electrical system to a similarly frequency-modulated third carrier wave of carrier frequency corresponding to the said predetermined center frequency of the first carrier wave, means for interacting the third carrier wave with the first carrier wave transmitted along the second path to produce a voltage having a direct-current component substantially proportional to the relative phase shift between the waves transmitted along the first and second paths at the said predetermined center frequency and an alternating-current component having a frequency corresponding to the said predetermined rate of variation and the peak-to-peak magnitude of which is substantially proportional to the difference between the relative phase shifts between the waves transmitted along the first and second paths at the said limits of the said frequency variation, means for indicating the said alternating-current component of the said voltage, and means for calibrating the said indication in units of time, thereby to indicate the envelope delay of the electrical system relative to the said predetermined envelope delay.

9. Apparatus for measuring the envelope delay introduced by an electrical system into an alternating-current wave of predetermined frequency having, in combination, an alternating-current generator of frequency corresponding to the said predetermined frequency, means for varying the said predetermined frequency within narrow frequency limits at a predetermined rate, a phase detector having a pair of inputs and an output, means for connecting the generator to one of the inputs through the electrical system, means for connecting the generator to the other input through a path of predetermined envelope delay, and an alternating-current indicator adapted to respond to alternating-current energy of the said predetermined rate connected to the output of the phase detector and having calibrations in units of time.

10. Apparatus for measuring the envelope delay introduced by an electrical system into an alternating-current wave of predetermined frequency having, in combination, an alternating-current generator of frequency corresponding to the said predetermined frequency, means for varying the said predetermined frequency within narrow frequency limits at a predetermined rate, a phase detector having a pair of inputs and an output, means for connecting the generator to one of the inputs through the electrical system, means for connecting the generator to the other input through a path of substantially zero phase shift, and an alternating-current indicator adapted to respond to alternating-current energy of the said predetermined rate connected to the output of the phase detector and having calibrations in units of time.

11. Apparatus for measuring the envelope delay introduced by an electrical system into an alternating-current wave of predetermined frequency having, in combination, a first alternating-current generator of a first carrier wave corresponding to the said predetermined frequency, means for varying the said generated predetermined frequency within narrow frequency limits at a predetermined rate, thereby to frequency-modulate the first carrier wave of the first generator, a second generator of variable frequency, first and second mixers each having an input and an output, means for connecting the input of the first mixer to the first and second generators to produce in the first-mixer output a second frequency-modulated carrier wave of lower carrier frequency than the predetermined frequency, means for connecting the electrical system between the output of the first mixer and the input of the second mixer, means for connecting the second generator to the input of the second mixer, a phase detector having a pair of inputs and an output, means for connecting the output of the second mixer to one of the phase-detector inputs, means comprising a path of predetermined envelope delay connected between the first generator and the other phase-detector input, and means for connecting to the output of the phase detector an alternating-current indicator adapted to respond to alternating-current energy of the said predetermined rate, the indicator having calibrations in units of time.

12. Apparatus for measuring the envelope delay introduced by an electrical system into an alternating-current wave of predetermined frequency having, in combination, a first alternating-current generator of a first carrier wave corresponding to the said predetermined frequency, means for varying the said generated predetermined frequency within narrow frequency limits at a predetermined rate, thereby to frequency-modulate the first carrier wave of the first generator, a second generator of variable frequency, first, second and third mixers each having an input and an output, means for connecting the input of the first mixer to the first and second generators to produce in the first-mixer output a second frequency-modulated carrier wave of lower carrier frequency than the predetermined frequency, means for connecting the input of the second mixer to the first generator and to the output of the first mixer to produce in the second mixer output a second frequency-modulated carrier wave of carrier frequency corresponding to the frequency of the second generator, means for connecting the electrical system between the output of the first mixer and the input of the third mixer, means for connecting the output of the second mixer to the input of the third mixer, a phase detector having a pair of inputs and an output, means for connecting the output of the third mixer to one of the phase-detector inputs, means comprising a path of predetermined envelope delay connected between the first generator and the other phase-detector input, and means for connecting to the output of the phase detector an alternating-current indicator adapted to respond to alternating-current energy of the said predetermined rate, the indicator having calibrations in units of time.

References Cited in the file of this patent

UNITED STATES PATENTS

| | | |
|---|---|---|
| 2,047,782 | Jensen | July 14, 1936 |
| 2,285,038 | Loughlin | June 2, 1942 |
| 2,416,310 | Hansen et al. | Feb. 25, 1947 |
| 2,625,614 | Schelleng | Jan. 13, 1953 |
| 2,685,062 | Schroeder et al. | July 27, 1954 |
| 2,752,565 | Van Weel | June 26, 1956 |
| 2,808,562 | French et al. | Oct. 1, 1957 |

FOREIGN PATENTS

| | | |
|---|---|---|
| 701,423 | Germany | Jan. 16, 1941 |

OTHER REFERENCES

Ring: Bell System Tech. Journal, "Measurement of Delay Distortion in Microwave Repeaters," vol. 27, April 1948, pages 247–264.